(12) United States Patent
Suk

(10) Patent No.: US 7,289,169 B2
(45) Date of Patent: Oct. 30, 2007

(54) STORAGE OF PROJECTED PRESENTATIONS

(75) Inventor: Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 867 days.

(21) Appl. No.: 10/642,869

(22) Filed: Aug. 18, 2003

(65) Prior Publication Data

US 2005/0041118 A1    Feb. 24, 2005

(51) Int. Cl.
 *G09G 5/00*    (2006.01)
(52) U.S. Cl. ............... 348/744; 348/333.1; 348/745; 348/746
(58) Field of Classification Search ............ 348/333.1, 348/744; 353/121; 345/530, 555, 545

See application file for complete search history.

(56) References Cited

U.S. PATENT DOCUMENTS

| 6,836,870 | B2 * | 12/2004 | Abrams ...................... 715/730 |
| 6,892,351 | B2 * | 5/2005 | Vasudevan et al. ......... 715/716 |
| 6,989,801 | B2 * | 1/2006 | Bruning ..................... 345/2.1 |
| 2002/0140724 | A1 * | 10/2002 | Qureshi et al. ............ 345/730 |
| 2003/0193566 | A1 * | 10/2003 | Matsuda et al. ........... 348/189 |

* cited by examiner

*Primary Examiner*—David Ometz
*Assistant Examiner*—Pritham D. Prabhakher
(74) *Attorney, Agent, or Firm*—Lewis L. Nunnelley; Dillon & Yudell LLP

(57) ABSTRACT

A method and system for capturing real-time digital image data that is in rasterized form. A digital source sends rasterized data to a storage device, which passes the rasterized data to a display device. The rasterized data is then converted into a page format, such as PowerPoint™ formatted slides, based on changes in the rasterized data. If the data changes quickly enough, the storage device converts the rasterized data into a motion picture format. Otherwise, the rasterized data is stored as a single page static image.

10 Claims, 9 Drawing Sheets

STORAGE OF PROJECTED PRESENTATIONS

BACKGROUND OF THE INVENTION

1. Technical Field

The present invention relates in general to digital data storage, and in particular to capturing digital data from a live presentation. Still more particularly, the present invention relates to a method and system for converting transmitted rasterized data into a format suitable for storage in an application software format.

2. Description of the Related Art

Many live presentations are made using a laptop connected to a beam projector or large screen monitor. For example, FIG. 1 depicts a system in which a computer 102 sends image data via cable 104 to a digital projector 106 for projection onto a screen 108.

The display projected by digital projector 106 is analogous to the display of a cathode ray tube (CRT) monitor or a liquid crystal display (LCD) monitor. The monitor (or projector) displays a sequence of horizontal lines made up of many points called pixels. This sequence of horizontal lines is called a "grid" in an LCD monitor or digital projector, and is called a "raster" in a CRT monitor. The complete sequence of horizontal lines is rapidly scanned to avoid flicker.

File data stored in computer 102, such as file data from a PowerPoint™ file, is first converted into a stream of data that controls each pixel in a projected display. When in this form, the stream of data is referred to as being "rasterized."

Often, after a live presentation, many in the audience ask for a copy of the material that was presented. Such a request is relatively easy to fulfill if the presentation was solely a showing of a PowerPoint™ or similar file. That is, the presenter only has to send the requester a floppy disk or e-mail attachment with the presentation, assuming the presenter remembers the request and still has the requester's contact information.

However, if the presentation displays images from a non-computer digital data source, such as a digital camera, memory stick reader, etc., or if the presentation is of images that are not stored on the computer, such as a presentation from another computer or passed-through streaming audio or video data from the Internet, then making a copy of the presentation to send to the requester becomes difficult, if not impossible.

Furthermore, a presenter might manipulate a canned program during the presentation, making a saved program file different from the presentation. That is, while showing a PowerPoint™ program, the presenter may skip over a slide that is inappropriate for his audience, or may use a mouse pointer to draw attention to a part of a photo or drawing while discussing that slide. If the requester were only to review the original stored PowerPoint™ program, any additional information given by the presenter would be missing from the stored program.

Thus, what is needed is a method and system that permits capturing rasterized digital data and storing that data into a known file format that is easily communicated to another party. Preferably, the system would capture previously stored image data, as well as real-time manipulations of the image data. It would also be beneficial if such a system provided an easy way to send the captured image data to a requester.

SUMMARY OF THE INVENTION

In view of the foregoing, the present invention provides a method, system, and program product supporting capturing real-time digital image data that is in rasterized form. A digital source sends rasterized data to a storage device, which passes the rasterized data to a display device. The rasterized data is then converted into a page format, such as PowerPoint™ formatted slides, based on changes in the rasterized data. If the data changes quickly enough, the storage device converts the rasterized data into a motion picture format. Otherwise, the rasterized data is stored as a single static frame image. According to one preferred embodiment, the storage device is directly connected to a network, such that a file formed from the converted rasterized data is sent to a requesting party as an e-mail attachment.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
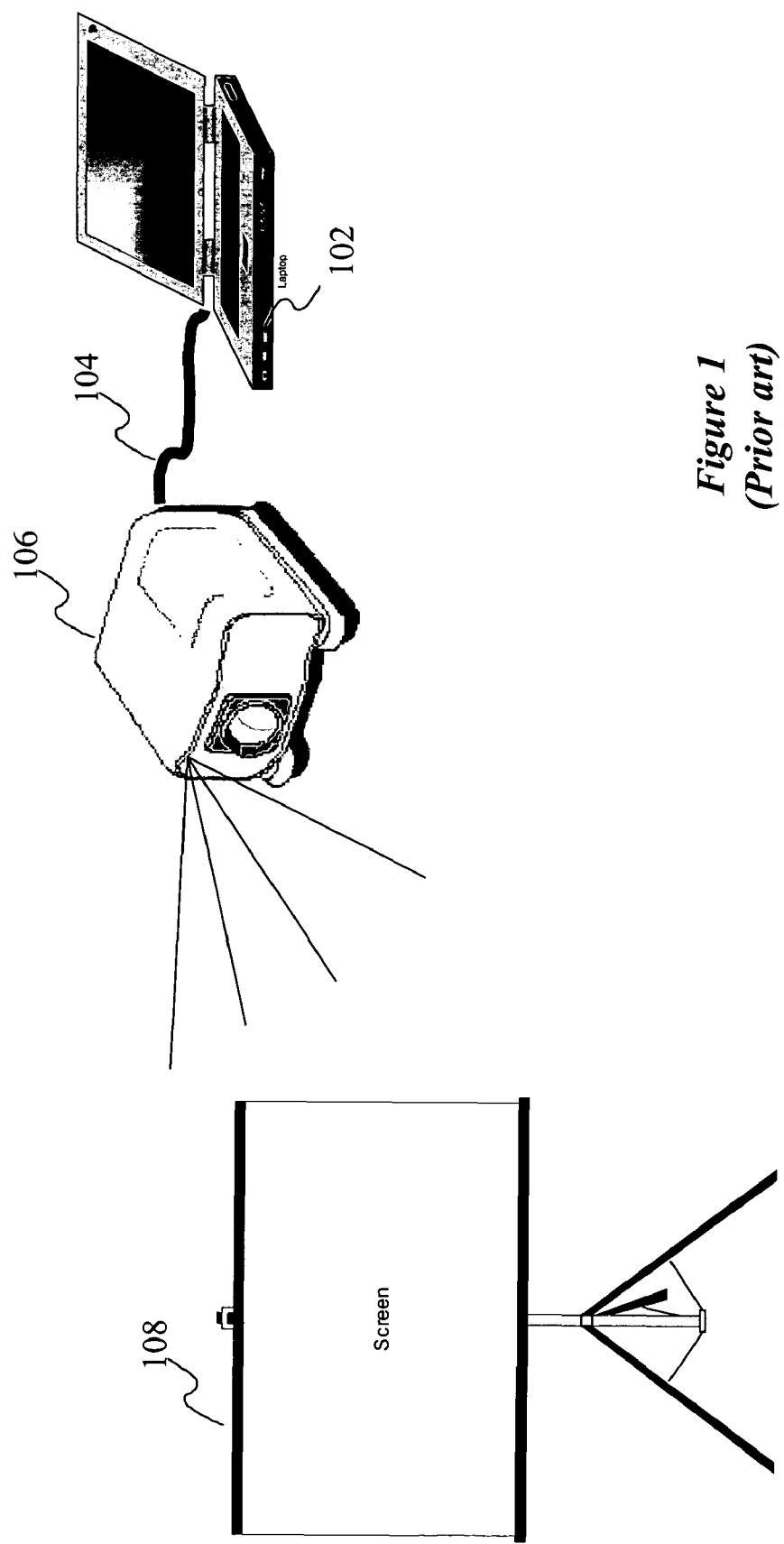
FIG. 1 depicts a prior art system in which a computer sends image data via a cable to a digital projector for projection onto a screen.
Figure 2:
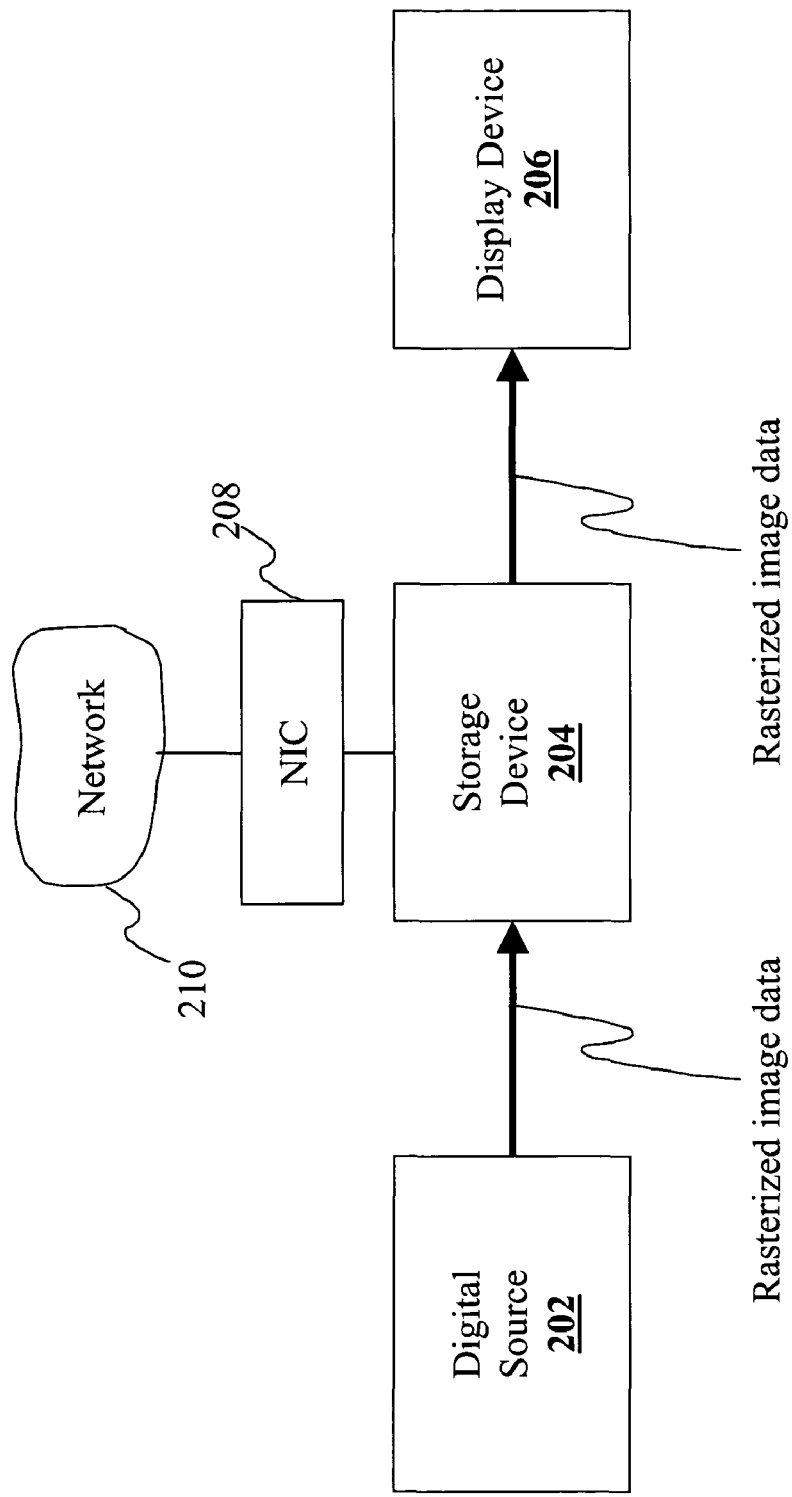
FIG. 2 illustrates the inventive system having a storage device for capturing rasterized digital data being transmitted from a digital source to a display device.

The present invention discloses a system for storing manipulated rasterized image data. As shown in FIG. 2, such a system 200 includes a digital source 202 sending rasterized image data to a storage device 204, which stores the image data in a converted format and also passes through unconverted rasterized image data to a display device 206. In a preferred embodiment, storage device 204 is connected to a network 210 via a network interface card 208, allowing a file stored in storage device 204 to be communicated directly to a user device (not shown) connected to network 210. System 200, and particularly storage device 204, is described in detail below.

Figure 3:
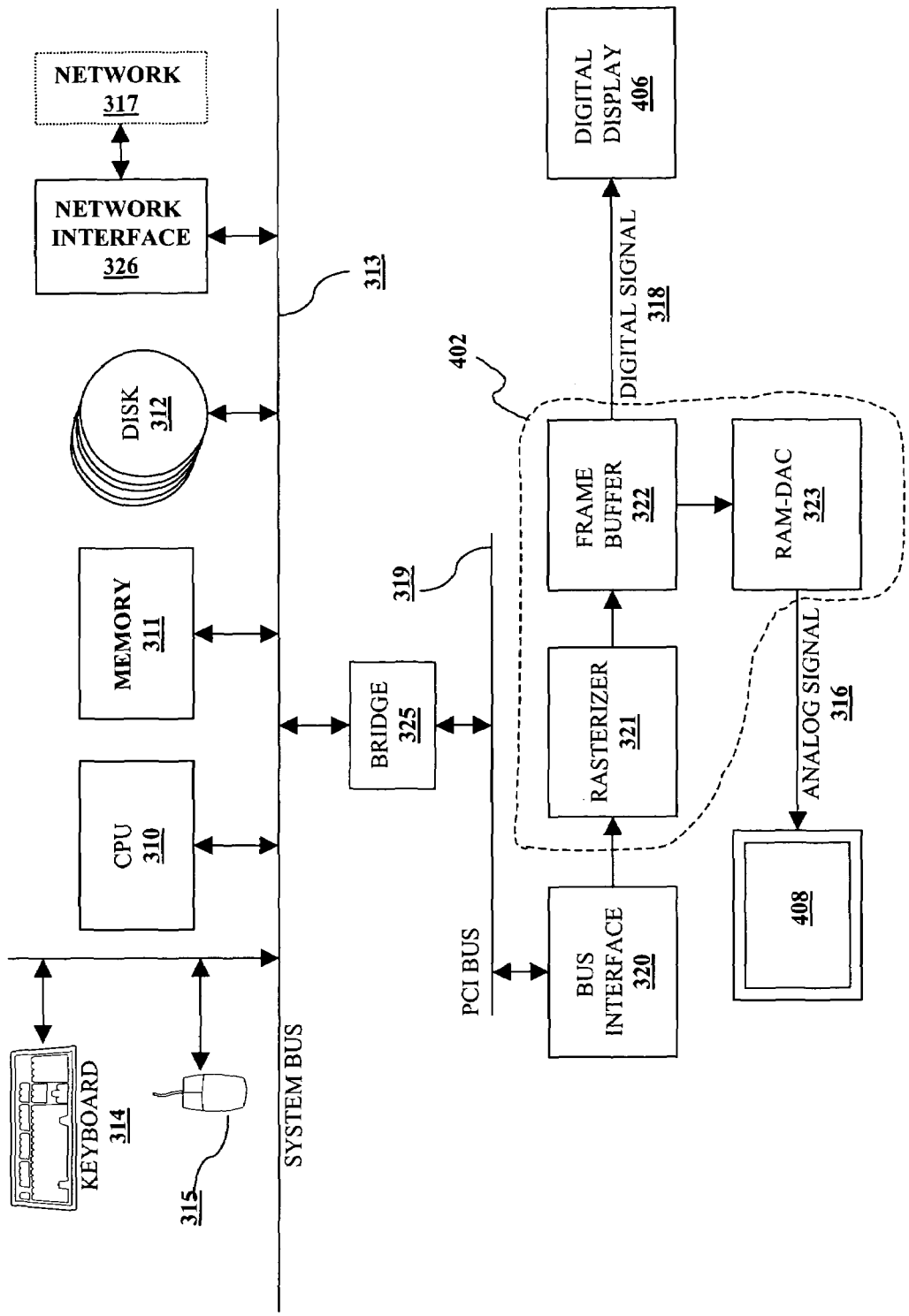
FIG. 3 depicts a computer system used as an exemplary digital source.

With reference now to FIG. 3, an exemplary digital source is depicted as computer system 300. Computer system 300 includes a CPU 310, main (physical) memory 311, and disk storage 312, interconnected by a system bus 313. Other peripherals such as a keyboard 314, a mouse 315, and a network interface adapter card 326 for interface to a network 317 are included in the computer system. A graphics subsystem 402 is connected to CPU 310 and memory 311 via a bridge 325, a PCI bus 319 and a bus interface 320.

Graphics subsystem 402 includes a rasterizer 321 that generates pixel data for a bit-mapped image to be displayed. The bit-mapped image is stored in a frame buffer 322. The data stored in the frame buffer is read out via a Random Access Memory and Digital-to-Analog Converter (RAM-DAC) 323 to a cathode ray tube (CRT) display 408 as an analog signal 316. Alternatively, if the display is a digital display 406, such as a digital monitor or a digital projector, frame buffer 322 sends a digital signal 318 to a digital display 406. In either case, the frame buffer 322 is bit-mapped to the screen of the display, each pixel of the display having a corresponding location in frame buffer 322 storing a definition of what is to be displayed for each pixel during a raster scan. This definition includes color, intensity, etc., and usually contains reference to palettes or tables for expanding the information to be displayed for the pixel.

In order avoid tying up busses 313 and 319, and using too much of CPU 310's time, rasterizer 321 generates most of the pixel data to be stored in frame buffer 322. CPU 310 generates graphics primitives that describe what is to be displayed in a higher-level or more abstract expression, and these are transferred via busses 313 and 319 and interface 320 to rasterizer 321, which generates the pixel data. The bandwidth used by the output of rasterizer 321 is much greater than that of busses 313 and 319 for video data. For example, a 1024×1024 pixel color screen refreshed 50/sec., with 24-bits per pixel, requires a bandwidth of 150-Mbytes/sec. Thus, busses (not shown) downstream of rasterizer 321 operate at this speed to convey screen data. A much lower bandwidth is needed for transfers over busses 313 and 319, in supporting the graphics subsystem from CPU 310 and memory 311.

Figure 4:
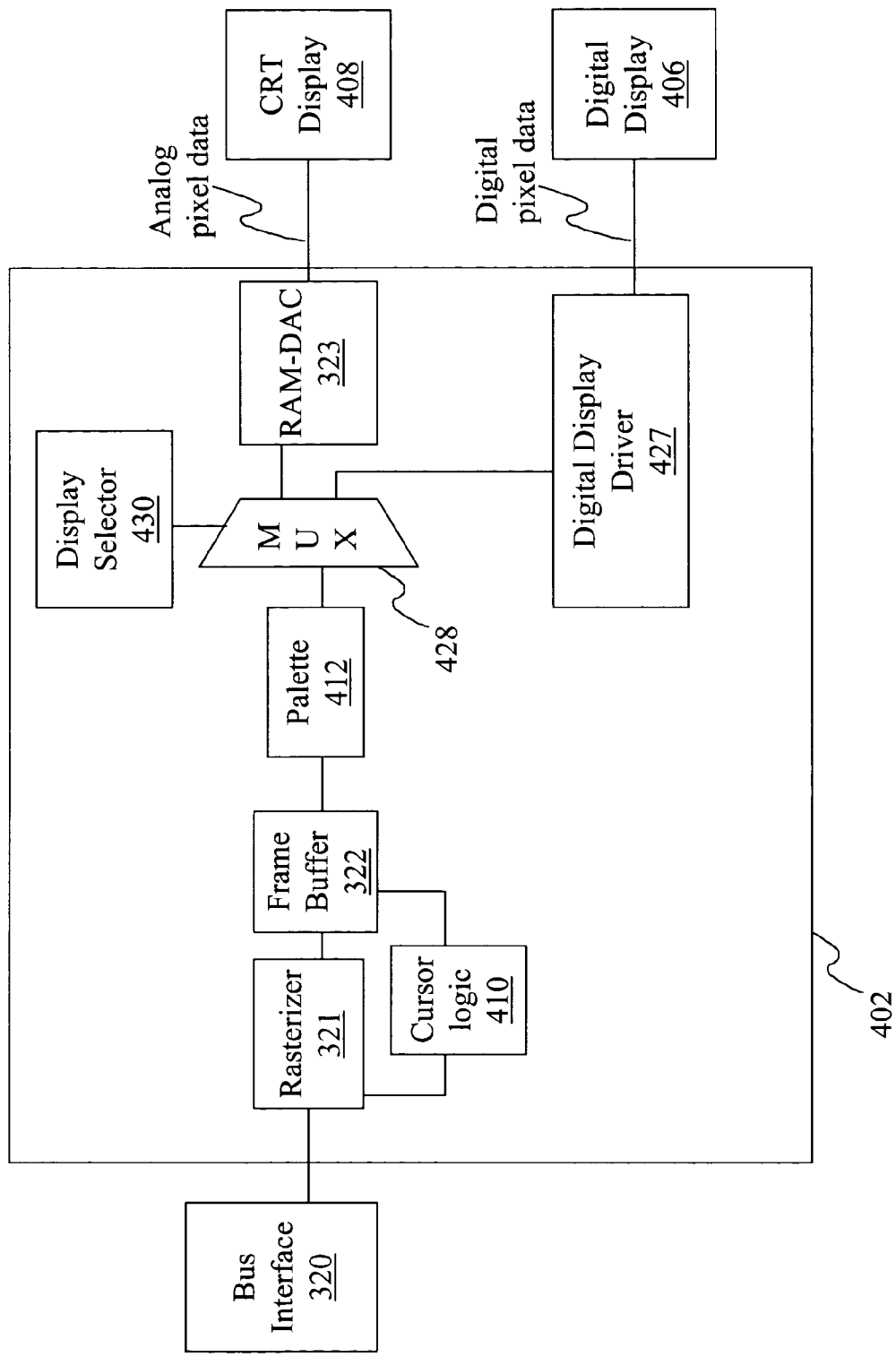
FIG. 4 illustrates additional detail of a graphics subsystem in a computer system.

FIG. 4 illustrates additional detail of graphics sub-system 402. Graphics sub-system 402 includes rasterizer 321 and frame buffer 322 as well as a cursor logic 410 and a color palette 412. As introduced above, rasterizer 321 takes high-level commands from software running on an associated CPU, such as CPU 310 in FIG. 3, and generates pixel data for display. Pixels are written to frame buffer 322. Cursor logic 410 generates hardware cursors and overlays, commonly referred to as "sprites", for display on a selected digital display 406 and/or CRT display 408. Palette 412 generates pixel color information. In a preferred embodiment of the present invention, the sprite generated by cursor logic 410 is incorporated into data in frame buffer 322 to produce a single frame image for display (combining both the main display as well as the sprite overlay).

Pixel data generated by rasterizer 321, cursor logic 410 and palette 412 are input to either RAM-DAC 323 or a digital display driver 427, according to a control signal from a display selector 430 to multiplexer (MUX) 428. If the pixel data is sent to and converted to analog data in RAM-DAC 323, then that analog data is sent to CRT display 408. If the pixel data is sent to a digital display driver 427, then the pixel data remains digital and is sent to a digital display 406.

Figure 5:
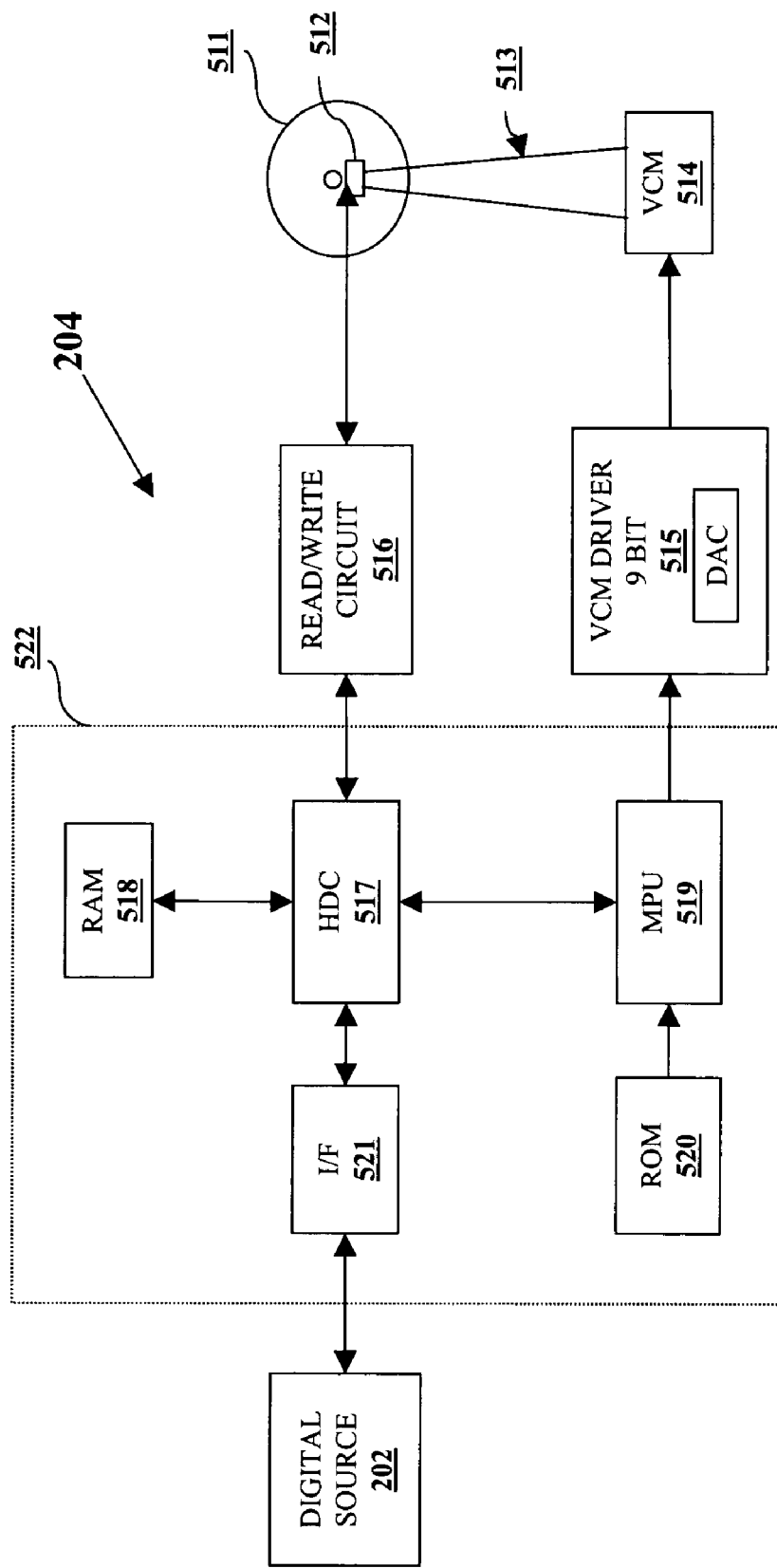
FIG. 5 depicts an exemplary disk drive storage device used by the present invention.

FIG. 5 is a block diagram showing a disk drive storage device 204, as shown in FIG. 2, according to a preferred embodiment of the present invention. Storage device 204 preferably has a magnetic disk 511 (disk storage medium in either hard or floppy format) as a data record medium, and a magnetic head 512 for reading/writing data from/into the magnetic disk 511. The storage device 204 also has an actuator mechanism 513 for moving a slider which carries the magnetic head 512 to a particular position over a surface of the magnetic disk 511, a voice coil motor (VCM) 514 for causing an access arm of the actuator mechanism 513 to swing, and a VCM driver 515 which includes a spindle motor for causing the magnetic disk 511 to rotate and drive the VCM 514. The storage device 204 further has a read/write circuit 516 for controlling a data read/write operation, which contains a module including an amplifier circuit for a detection signal, a waveform shaper, an analog-to-digital converter (ADC), a digital-to-analog converter (DAC). The storage device 204 also has a hard disk controller (HDC) 517 for controlling the data read/write operation from/into the magnetic disk 511, a RAM 518 for temporarily storing data fed thereto and caching data to be recorded into the magnetic disk 511 and data reproduced from the magnetic disk 511, a microprocessor unit (MPU) 519 for controlling an operation of the entire HDD inclusive of the HDC 517, a ROM 520 for storing microprograms and data to operate the MPU 519, and an interface (I/F) 521 which is connected to digital source 202 through a bidirectional line. The digital data that is provided to I/F 521 is either the digital pixel data from digital display driver 427, or is reconverted digital data from the analog pixel data from RAM-DAC 323 that has been reconverted into digital data by an analog-to-digital converter (ADC), which is not shown.

The VCM driver 515 includes a 9-bit digital-to-analog converter (DAC), which converts a digital control signal from the MPU 519 into an analog control signal and transmits it to the VCM 514. The HDC 517, the RAM 518 and the MPU 519 are connected to each other through a data bus. Further, the HDC 517 is connected with the MPU 519 through a control bus, and is connected with digital source 202 through the I/F 521.

The magnetic disk 511 may be of an embedded servo (i.e., a sector servo) type in which a disk surface has concentric and circular tracks each containing both data regions in which data is recorded and servo regions in which servo data is previously recorded, or of a servo surface servo type in which one of the disk surfaces of the magnetic disk is for servo use only, while only data is recorded on the other disk surface.

Magnetic disk 511 has a plurality of concentric and circular data tracks, each of which includes n LBAs (logical block addresses), where n represents an arbitrary positive integer. The magnetic disk 511 is formatted so as to include a first track having a predetermined number of first sequential LBAs, a second track having a predetermined number of second sequential LBAs which immediately follow the first sequential LBAs, and at least one track disposed between the first track and the second track. The HDC 517, the RAM 518, the MPU 519, the ROM 520 and the I/F 521 as a whole operate to control the operation of the entire HDD, and constitutes a controller 522 which controls a data input from digital source 202. The controller 522 includes the MPU 519, which executes a control program, a memory that stores data such as the control program and a defect map indicating locations of defective sectors, and other components. The memory includes the RAM 518 and the ROM 520, and the control program is stored in the ROM 520, for example. While data stored in the ROM 520 can be read at a high speed, there is a limitation on the capacity of the ROM 520 because of packaging technology and cost reduction.

Accordingly, a portion of the control program which cannot be stored in the ROM 520 may be saved in a given region of the magnetic disk 511, and may be read out from the magnetic disk 511 and written into the RAM 518 upon power on reset (POR) for execution of the control program. Further, the RAM 518 has a function of a cache memory having a storage capacity on the order of data of several hundreds of record units (i.e., sectors) on the magnetic disk, for example, 128 KB (256 blocks).

The controller 522 controls the operation of the entire HDD by executing the control program (microprogram), controlling a write operation with respect to the magnetic disk 511 on the basis of commands stored in MPU 519 and data which is fed from digital source 202 through the I/F 521. The MPU 519 of the controller 522 is capable of executing a plurality of processes in parallel. One of these processes relates to a manipulation of data from digital source 202, as discussed in detail below with reference to FIG. 6. Another is a write cache process in which the write data saved in a buffer (RAM 518) is written into the magnetic disk 511, and a further one relates to a seek control in which the magnetic head is brought substantially radially over the magnetic disk 511 to be positioned on a particular one of the tracks. In addition, the MPU 519 is capable of executing processes such as arithmetic operations for the servo control, an error recovery process and the like in parallel.

Although storage device 204 is depicted as a hard disk drive, it is understood that in the preferred embodiment of the present invention, storage device 204 may be any secondary storage device, including a floppy disk drive, a read/write compact disk read only memory (RW-CDROM), a Zip drive, etc.

Figure 6:
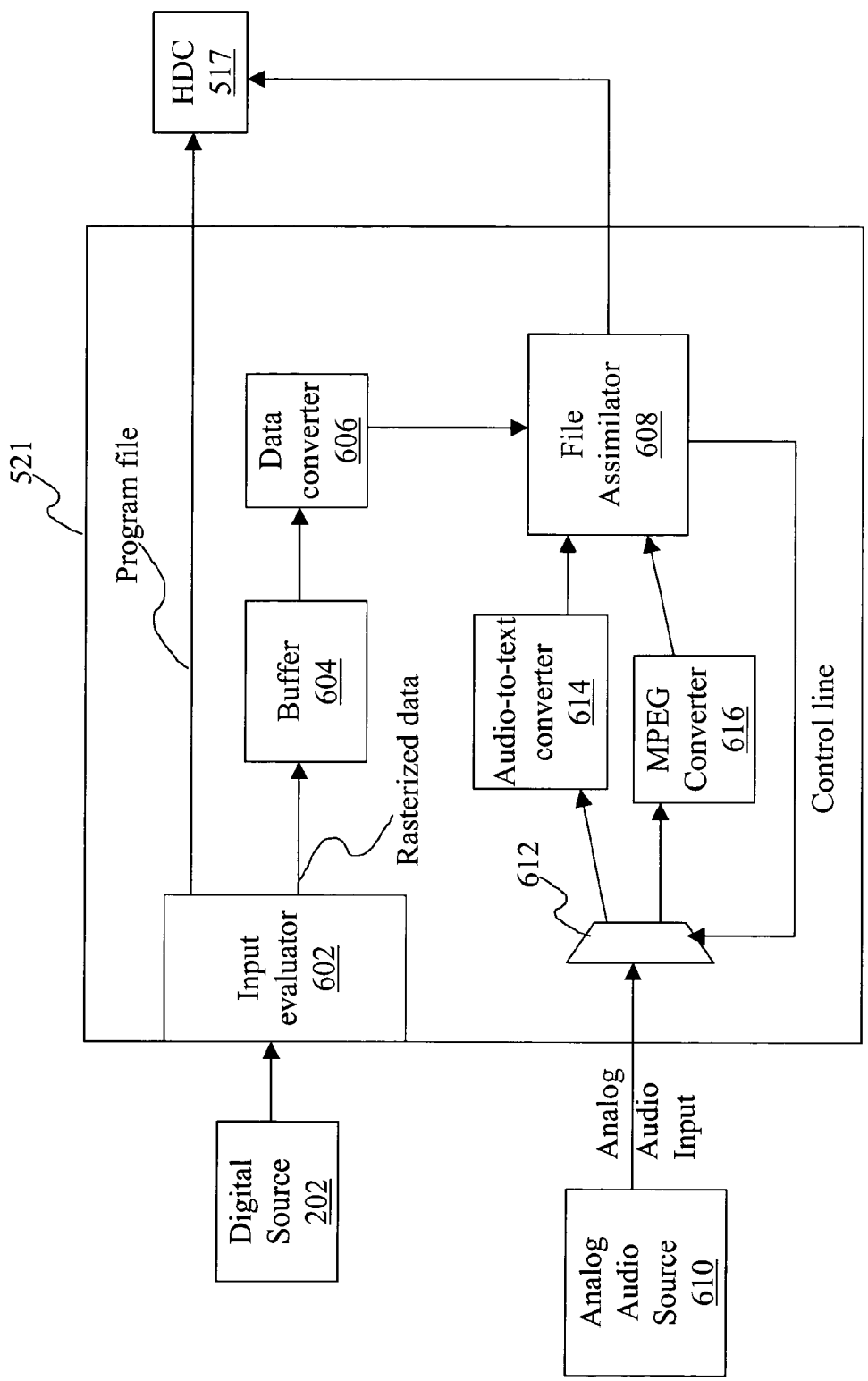
FIG. 6 illustrates additional detail of an interface in the disk drive storage device.

As mentioned above, MPU 519 also controls the function of I/F 521, which is now discussed as shown in more detail in FIG. 6. As digital data from digital source 202 is received at I/F 521, an input evaluator 602 first determines whether the digital data is rasterized video data or a program file. That is, in the preferred embodiment of the present invention, it is presumed that the digital data from digital source 202 is rasterized video data. However, there is a possibility that the digital data may be a file, such as a PowerPoint™ file, which is already assimilated for storage, and thus is sent directly to the HDC 517 for storage. But if the digital data is rasterized video digital data, then the input evaluator 602 sends that rasterized data to a buffer 604, where the data is combined with other rasterized data if the rasterized data is a moving video, or is directly sent to a data converter 606 if the rasterized data is a single static video frame. The multi-frame or single frame pages of video are then sent to a file assimilator 608 for assimilation into a file format appropriate for storage under the control of HDC 517.

I/F 521 may also receive an audio input from an analog audio source 610, such as an amplified microphone. If so, the audio input is either converted into an audio digital file by MPEG converter 616, or is converted into written text by 614, according to routing by MUX 612, before being sent to file assimilator 608. In a preferred embodiment of the present invention, each audio file, whether in an auditory MPEG file or written text, is associated with the appropriate video page, whether that page be a single frame or a multi-frame moving image. Thus, each page has an audio script that can be heard (MPEG) or read (text conversion) with the page, whether that page is a single slide or a moving picture clip.

Figure 7:
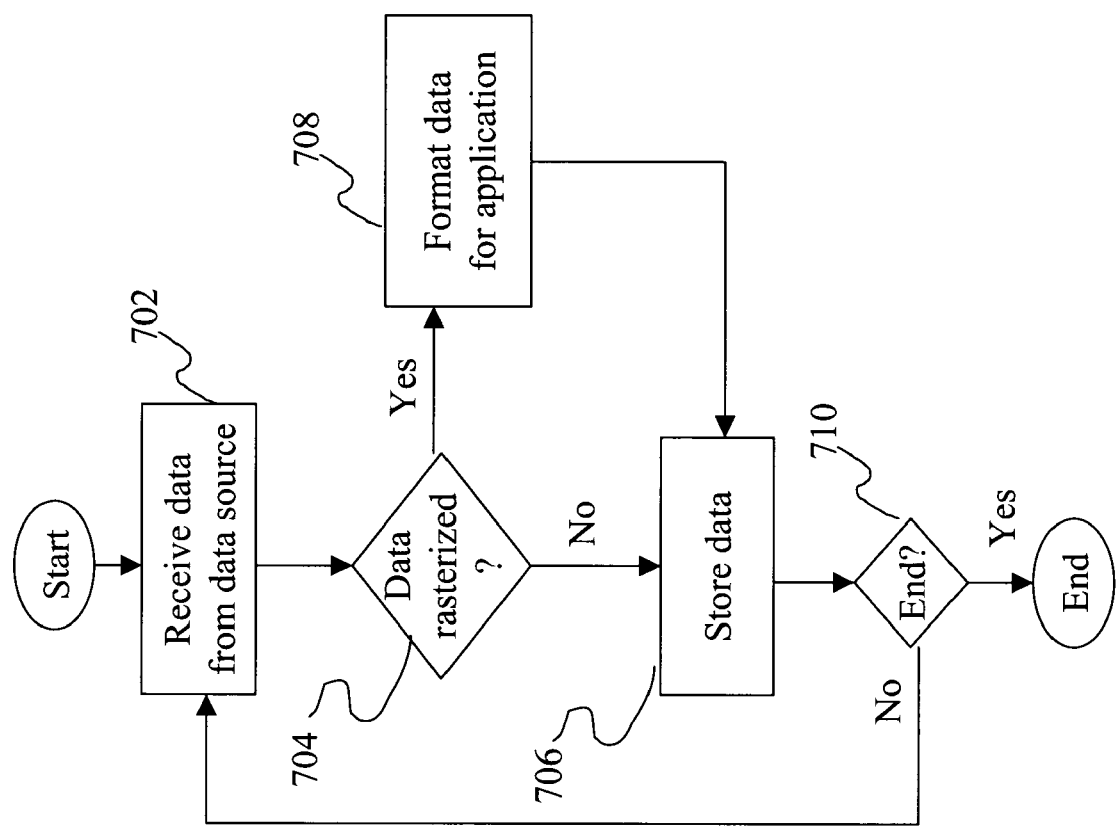
FIG. 7 is a flow-chart of an evaluation of a format of digital data received at the disk drive storage device.

With reference now to FIG. 7, there is depicted a flowchart of data storage to storage device 204. Data is received at storage device 204 from digital source 202 (block 702). If the digital data is in a high-level program format (block 704), such as PowerPoint™, then it is stored as such (block 706). If the digital data is rasterized video digital data, it is first converted into a high-level program format (block 708) before being stored. The process continues until a decision is made to stop (block 710).

Figure 8:
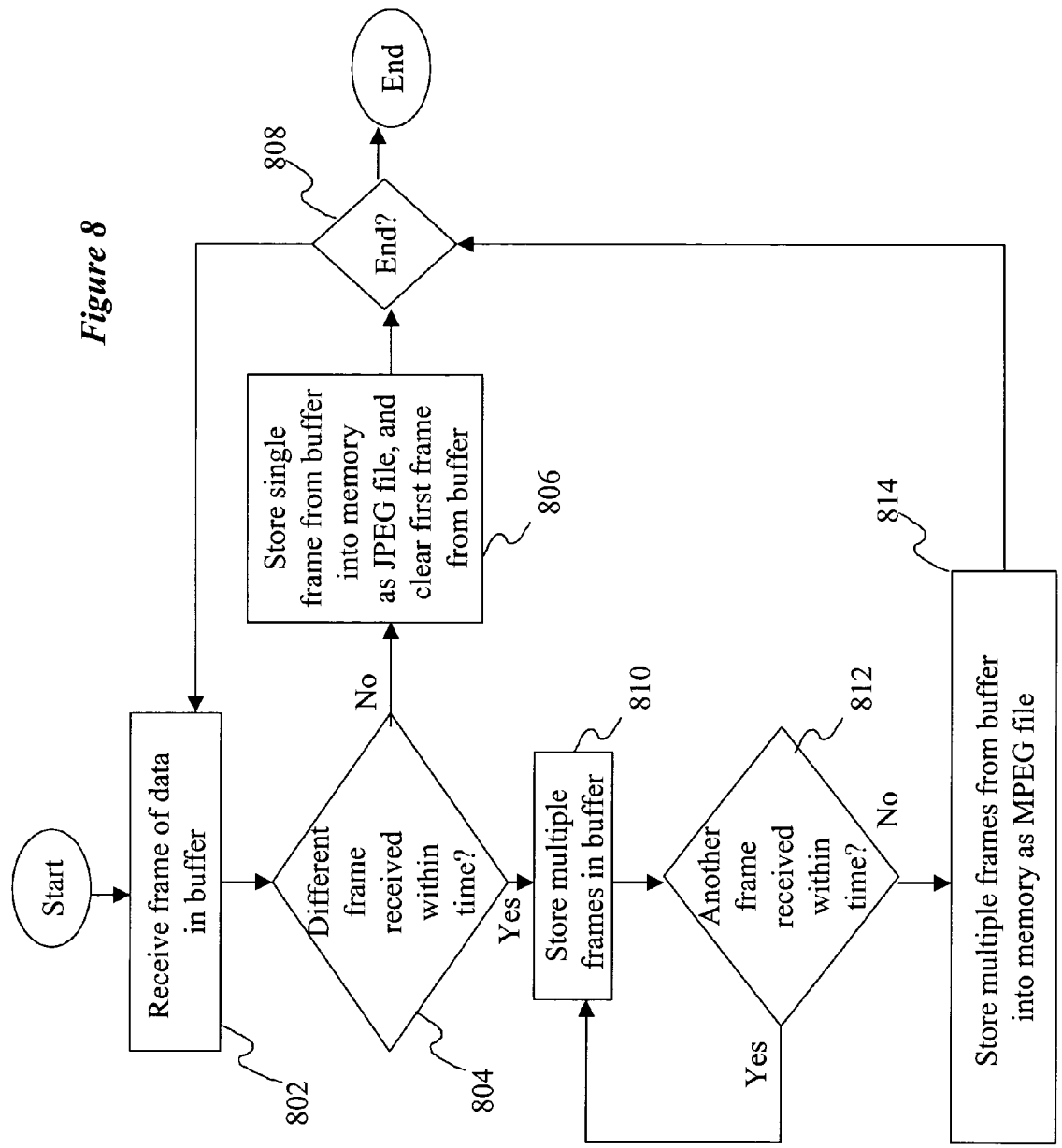
FIG. 8 is a flow-chart of a determination of whether digital data is to be stored as a single frame file or a multi-frame animated file.

Determining how to store each page of video data is depicted in FIG. 8. Starting with block 802, a frame of data is received in buffer 604 (FIG. 6), after being determined that the data is rasterized digital video data by input evaluator 602. A decision is then made to determine whether the incoming data is part of a single page having animation (moving pictures), or is a single page having only a single static image. That is, a moving picture is simply a stream of static images sent to a display quickly, to provide animation. If a different frame is received (block 804) in buffer 604 within a predetermined amount of time, such as within 1/20 second, then the first and second received frames are assumed to be part of a moving animated image, and are stored together as multiple frames of a same page (block 810). Subsequent frames are also stored if received within the next predetermined amount of time (since the last frame was received) and are ultimately stored as a single MPEG file (blocks 812 and 814).

If a subsequent frame is received after the predetermined amount of time, then the first frame is stored as a JPEG file for storage as a single image, and the buffer 604 is cleared of the first frame (block 806). The process continues until a decision is made to terminate the storage of the rasterized images.

As noted above, each page may have an associated audio track, which is stored either as text or an MPEG file for later hearing/reading by the requester of the presentation.

Figure 9:
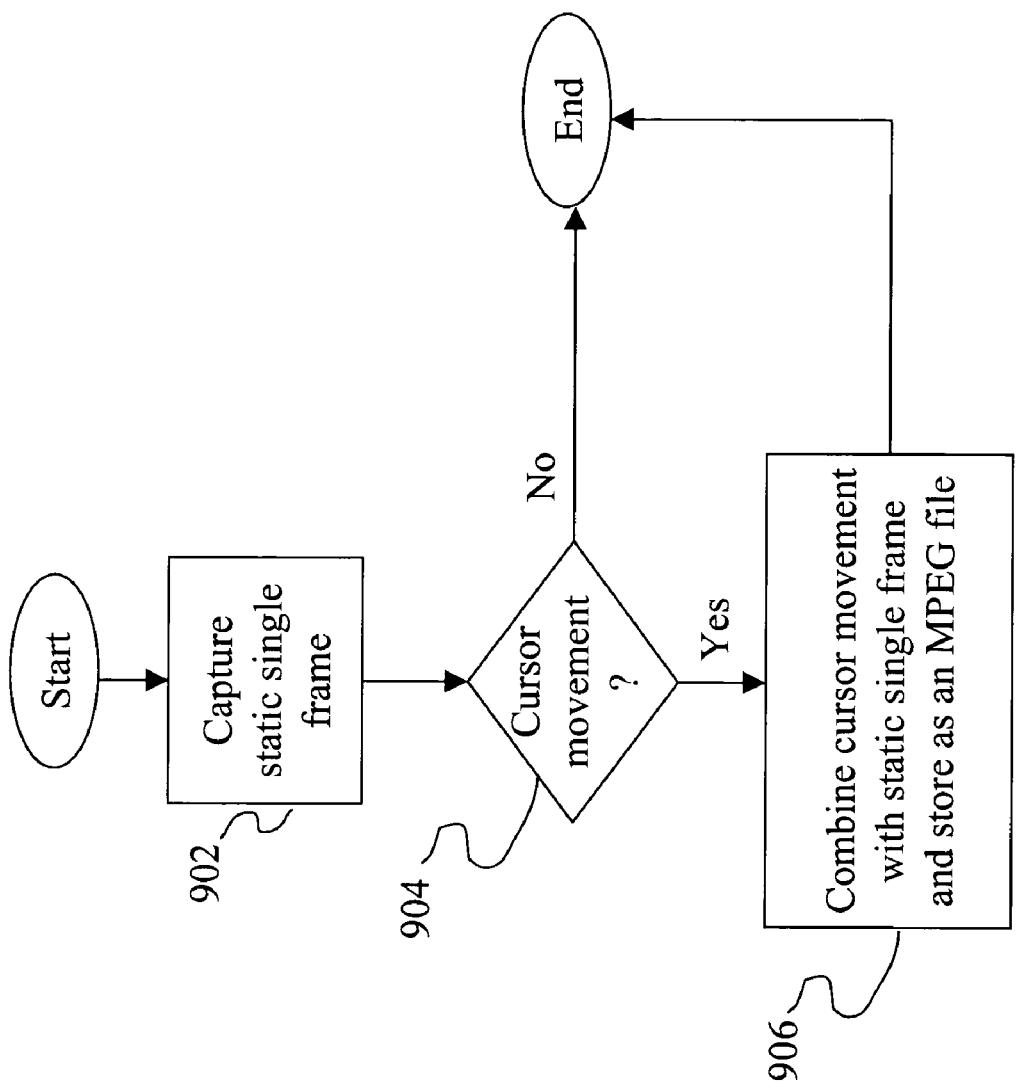
FIG. 9 is flow-chart describing capturing cursor movement over a static single frame.

In a preferred embodiment, cursor movement is also captured and stored by the present invention. Referring now to FIG. 9, a static single frame is captured as described above (block 902). Cursor logic 410 shown in FIG. 4 detects whether there is cursor movement over the static single frame (block 904). If so, then the static single frame and the cursor movement are combined together to create an MPEG animated image (block 906).

The present invention therefore provides an efficient method and system for capturing rasterized video digital data and converting that data into a file format for storage and sharing. The rasterized video digital data is source independent, being only raster data formatted for projector or monitor display. Thus, a presentation may include various digital data sources, and still be captured as a single program. That is, the presentation may switch back and forth between various programs files (such as different PowerPoint™ files), on-line and off-line sources, etc., and yet with the present invention the total presentation is captured and stored. Once stored, the file formatted data can be sent via the Internet to a requester, or can be saved to a removable medium (floppy disk, read/writable CD-ROM, etc.) and given to the requester.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A storage device for capturing a digital presentation, the storage device comprising:
   a buffer for storing a first page of rasterized data from a digital source;
   a timer for timing a receipt of a next page of rasterized data; and
   a data converter for storing the first page and the next page of rasterized data as a moving image if the next page of rasterized data is received during a pre-determined period of time after storing the first page of rasterized data, and for storing the first page of rasterized data as a single image if the next page is received after the pre-determined period of time.

2. The storage device of claim 1, further comprising:
   an evaluator for determining if a digital data received at the storage device is rasterized data;
   a data converter for converting rasterized data into a format suitable for an application program; and
   a file assimilator for assembling the converted rasterized data into a single file.

3. The storage device of claim 2, further comprising:
   a converter for converting an audio input into a digital audio format, the digital audio being stored by the file assimilator such that the digital audio is associated with a corresponding page of video.

4. A method for capturing a digital presentation, the method comprising:
   storing a first page of rasterized data from a digital source;
   timing a receipt of a next page of rasterized data;
   storing the first page and the next page of rasterized data as a moving image if the next page of rasterized data is received during a pre-determined period of time after storing the first page of rasterized data; and
   storing the first page of rasterized data as a single image if the next page is received after the pre-determined period of time.

5. The method of claim 4, further comprising:
   determining if a digital data received at the storage device is rasterized data;
   converting rasterized data into a format suitable for an application program; and
   assembling the converted rasterized data into a single file.

6. The method of claim 4, further comprising:
   converting an audio input into a digital audio format, the digital audio being stored by the file assimilator such that the digital audio is associated with a corresponding page of video.

7. The method of claim 4, further comprising:
   capturing a cursor movement from the digital source; and
   combining the cursor movement with the first and next page of rasterized data as the moving image.

8. The method of claim 5, further comprising: transmitting the converted rasterized data directly from the storage device to a network device.

9. The method of claim 5, wherein the rasterized data is sourced from multiple files.

10. The method of claim 9, wherein the multiple files are different PowerPoint files.

* * * * *